US012681956B2

(12) United States Patent (10) Patent No.: US 12,681,956 B2
Iscen et al. (45) Date of Patent: Jul. 14, 2026

(54) INPUT DATA ITEM CLASSIFICATION USING MEMORY DATA ITEM EMBEDDINGS

(71) Applicant: Google LLC, Mountain View, CA (US)

(72) Inventors: Ahmet Iscen, Seyssinet-Pariset (FR); Alireza Fathi, Redwood City, CA (US); Cordelia Luise Schmid, Saint Ismier (FR)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/626,268

(22) Filed: Apr. 3, 2024

(65) Prior Publication Data

US 2024/0338387 A1 Oct. 10, 2024

Related U.S. Application Data

(60) Provisional application No. 63/494,215, filed on Apr. 4, 2023.

(51) Int. Cl.
*G06F 16/28* (2019.01)
*G06F 16/242* (2019.01)

(52) U.S. Cl.
CPC ........ *G06F 16/285* (2019.01); *G06F 16/2438* (2019.01)

(58) Field of Classification Search
CPC .. G06F 16/285; G06F 16/2438; G06F 16/906; G06F 16/24556; G06F 16/355; G06F 16/243; G06F 16/2237; G06V 10/761; G06V 20/46; G06V 10/7715; G06V 10/82

USPC .......................................................... 707/737
See application file for complete search history.

(56) References Cited

U.S. PATENT DOCUMENTS

| | | | | |
|---|---|---|---|---|
| 11,947,912 B1 * | 4/2024 | Dong | .................... | G06F 40/284 |
| 2020/0285940 A1 * | 9/2020 | Sprechmann | ........... | G06N 3/04 |
| 2021/0383226 A1 * | 12/2021 | Doersch | ............... | G06N 3/0985 |
| 2022/0121702 A1 * | 4/2022 | Kale | ......................... | G06N 3/04 |
| 2022/0277015 A1 * | 9/2022 | Zhang | .................... | G06N 3/045 |
| 2022/0414169 A1 * | 12/2022 | Biswas | ............... | G06F 16/9538 |
| 2023/0113643 A1 * | 4/2023 | Mittal | .................... | G06F 16/75 |
| | | | | 382/159 |
| 2023/0252032 A1 * | 8/2023 | Na | ........................... | G06N 5/01 |
| | | | | 707/769 |
| 2024/0202464 A1 * | 6/2024 | Poirier | .................. | G06N 20/00 |
| 2024/0232580 A1 * | 7/2024 | Jaegle | .................... | G06N 3/084 |
| 2024/0403339 A1 * | 12/2024 | Azizi | ...................... | G06F 40/30 |

OTHER PUBLICATIONS

Alayrac et al., "Flamingo: a visual language model for few-shot learning," CoRR, Submitted on Nov. 15, 2022, arXiv:2204. 14198v2, pp. 1-54.
Basu et al., "Generalization properties of Retrieval-based models," CoRR, Submitted on Oct. 6, 2022, arXiv:2210.02617v1, pp. 1-38.

(Continued)

*Primary Examiner* — Evan Aspinwall
(74) *Attorney, Agent, or Firm* — Fish & Richardson P.C.

(57) ABSTRACT

Methods, systems, and apparatus, including computer programs encoded on computer storage media, for performing a classification task on a data item. In particular, a system classifies an input data item using key and value embeddings of memory data items.

30 Claims, 5 Drawing Sheets

(56)                    References Cited

OTHER PUBLICATIONS

Blattmann et al., "Semi-parametric neural image synthesis," CoRR, Submitted on Oct. 24, 2022, arXiv:2204.11824v3, pp. 1-34.

Borgeaud et al., "Improving language models by retrieving from trillions of tokens," Paper, Presented at Proceedings of the International Conference on Machine Learning, Baltimore, MD, Jul. 17-23, 2022; PMLR, 2022, 162:35 pages.

Brown et al., "Language models are few-shot learners," Paper, Presented at the 34th Conference on Neural Information Processing Systems, Virtual Event, Dec. 6-12, 2020; Advances in Neural Information Processing Systems, Dec. 2020, 33:1-25.

Chen et al., "PaLI: A Jointly-Scaled Multilingual Language-Image Model," CoRR, Submitted Sep. 16, 2022, arXiv:2209.06794v2, pp. 1-30.

Chen et al., "Re-Imagen: Retrieval-Augmented Text-to-Image Generator," CoRR, Submitted on Nov. 22, 2022, arXiv:2209.14491v3, pp. 1-25.

Chowdhery et al., "PaLM: Scaling Language Modeling with Pathways," CoRR, Submitted on Oct. 5, 2022, arXiv:2204.02311v5, pp. 1-87.

Collier et al., "Correlated input-dependent label noise in large-scale image classification," Paper, Presented at Proceedings of the IEEE/CVF Conference: Computer Vision and Pattern Recognition, Nashville, TN, Jun. 20-25, 2021, pp. 1551-1560.

Cui et al., "Parametric contrastive learning," Paper, Presented at Proceedings of the International Conference on Computer Vision, Montreal, Canada, Oct. 10-17, 2021, pp. 715-724.

Deng et al., "ImageNet: A Large-Scale Hierarchical Image Database," Paper, Presented at Proceedings of the IEEE Conference: Computer Vision and Pattern Recognition, Miami, FL, Jun. 20-25, 2009, 8 pages.

Deng et al., "PML: Progressive Margin Loss for Long-tailed Age Classification," Paper, Presented at Proceedings of the IEEE/CVF Conference: Computer Vision and Pattern Recognition, Nashville, TN, Jun. 20-25, 2021, pp. 10503-10512.

Dosovitskiy et al., "An image is worth 16×16 words: Transformers for image recognition at scale," Paper, Presented at Proceedings of the International Conference on Learning Representations, Virtual Event, May 3-7, 2021, pp. 1-21.

Graves et al., "Neural turing machines," CoRR, Submitted on Dec. 10, 2014, arXiv:1410.5401v2, pp. 1-26.

Guo et al., "Accelerating Large-Scale Inference with Anisotropic Vector Quantization," Paper, Presented at Proceedings of the International Conference on Machine Learning, Virtual Event, Jul. 13-18, 2020; PMLR, Mar. 2020, 119:10 pages.

Guo et al., "CurriculumNet: Weakly supervised learning from large-scale web images," Paper, Presented at Proceedings of the European Conference on Computer Vision, Germany, Munich, Sep. 8-14, 2018; LNCS, 2018, 11214:139-154.

Guo et al., "Long-tailed multi-label visual recognition by collaborative training on uniform and rebalanced samplings," Paper, Presented at Proceedings of the IEEE/CVF Conference: Computer Vision and Pattern Recognition, Nashville, TN, Jun. 20-25, 2021, pp. 15089-15098.

Guu et al., "REALM: Retrieval-augmented language model pre-training," CoRR, Submitted on Feb. 10, 2020, arXiv:2002.08909v1, 12 pages.

He et al., "Learning from imbalanced data," Paper, IEEE Transactions on Knowledge and Data Engineering, Sep. 2009, 21(9):1263-1284.

Hong et al., "Disentangling label distribution for long-tailed visual recognition," Paper, Presented at Proceedings of the IEEE/CVF Conference: Computer Vision and Pattern Recognition, Nashville, TN, Jun. 20-25, 2021, pp. 6626-6636.

Horn et al., "Benchmarking representation learning for natural world image collections," Paper, Presented at Proceedings of the IEEE/CVF Conference: Computer Vision and Pattern Recognition, Nashville, TN, Jun. 20-25, 2021, pp. 12884-12893.

Huang et al., "Learning deep representation for imbalanced classification," Paper, Presented at Proceedings of the IEEE/CVF Conference: Computer Vision and Pattern Recognition, Las Vegas, NV, Jun. 27-30, 2016, pp. 5375-5384.

Iscen et al., "A memory transformer network for incremental learning," CoRR, Submitted on Oct. 10, 2022, arXiv:2210.04485v1, pp. 1-12.

Iscen et al., "Learning with neighbor consistency for noisy labels," Paper, Presented at Proceedings of the IEEE/CVF Conference: Computer Vision and Pattern Recognition, New Orleans, LA, Jun. 18-24, 2022, pp. 4672-4681.

Khandelwal et al., "Generalization through memorization: Nearest neighbor language models," Paper, Presented at Proceedings of the International Conference on Learning Representations, Virtual Event, Apr. 26-May 1, 2020, pp. 1-13.

Kingma et al., "Adam: A method for stochastic optimization," CoRR, Submitted on Jul. 20, 2015, arXiv:1412.6980v7, pp. 1-13.

Lewis et al., "Retrieval-Augmented Generation for Knowledge-Intensive NLP Tasks," Paper, Presented at the 34th Conference on Neural Information Processing Systems, Virtual Event, Dec. 6-12, 2020; Advances in Neural Information Processing Systems, Dec. 2020, 33:1-16.

Li et al., "Web Vision Database: Visual Learning and Understanding from Web Data," CoRR, Submitted on Aug. 9, 2017, arXiv:1708.02862v1, 9 pages.

Liu et al., "Large-scale long-tailed recognition in an open world," Paper, Presented at Proceedings of the IEEE/CVF Conference: Computer Vision and Pattern Recognition, Long Beach, CA, Jun. 15-20, 2019, pp. 2537-2546.

Long et al., "Retrieval augmented classification for long-tail visual recognition," Paper, Presented at Proceedings of the IEEE/CVF Conference: Computer Vision and Pattern Recognition, New Orleans, LA, Jun. 18-24, 2022, pp. 6959-6969.

Loshchilov et al., "SGDR: Stochastic Gradient Descent with Warm Restarts," Paper, Presented at Proceedings of the International Conference on Learning Representations, Toulon, France, Apr. 24-26, 2017, pp. 1-16.

Menon et al., "Long-tail learning via logit adjustment," Paper, Presented at Proceedings of the International Conference on Learning Representations, Virtual Event, May 3-7, 2021, pp. 1-24.

Nakata et al., "Revisiting a kNN-Based Image Classification System with High-Capacity Storage," Paper, Presented at Proceedings of the European Conference on Computer Vision, Tel Aviv, Israel, Oct. 23-27, 2022; LNCS, 2022, 13697:17 pages.

Park et al., "The Long Tail of Recommender Systems and How to Leverage It," Paper, Presented at Proceedings of the RecSys Conference, Lausanne, Switzerland, Oct. 23-25, 2008, pp. 11-18.

Radford et al., "Learning transferable visual models from natural language supervision," Paper, Presented at the International Conference on Machine Learning, Virtual Conference, Jul. 18-24, 2021; PMLR, Apr. 2021, 139:16 pages.

Raffel et al., "Exploring the limits of transfer learning with a unified text-to-text transformer," Journal of Machine Learning Research, Jun. 2020, 21(140):1-67.

Rajeswar et al., "Multi-label iterated learning for image classification with label ambiguity," CoRR, Submitted on Nov. 23, 2021, arXiv:2111.12172v1, pp. 1-14.

Russakovsky et al., "ImageNet Large Scale Visual Recognition Challenge," Int J Comput Vis, Apr. 2015, 115(3):211-252.

Santoro et al., "Meta-learning with memory augmented neural networks," Paper, Presented at Proceedings of the International Conference on Machine Learning, New York, NY, Jun. 19-24, 2016; PMLR, 2016, 48:9 pages.

Schuhmann et al., "LAION-400M: Open Dataset of CLIP-Filtered 400 Million Image-Text Pairs," CoRR, Submitted on Nov. 3, 2021, arXiv:2111.02114v1, 5 pages.

Singh et al., "FLAVA: A foundational language and vision alignment model," Paper, Presented at Proceedings of the IEEE/CVF Conference: Computer Vision and Pattern Recognition, New Orleans, LA, Jun. 18-24, 2022, pp. 15638-15650.

Szegedy et al., "Rethinking the Inception Architecture for Computer Vision," Paper, Presented at Proceedings of the IEEE/CVF Confer-

(56) References Cited

OTHER PUBLICATIONS ence: Computer Vision and Pattern Recognition, Las Vegas, NV, Jun. 27-30, 2016, pp. 2818-2826.

Thomee et al., "YFCC100M: The New Datain Multimedia Research," Communications of the ACM, Feb. 2016, 59(2):64-73.

Tian et al., "VL-LTR: Learning Class-wise Visual-Linguistic Representation for Long-Tailed Visual Recognition," Paper, Presented at Proceedings of the European Conference on Computer Vision, Tel Aviv, Israel, Oct. 23-27, 2022; LNCS, 2022, 13685:1-17.

Wang et al., "Image as a Foreign Language: BEIT Pretraining for All Vision and Vision-Language Tasks," CoRR, Submitted on Aug. 31, 2022, arXiv:2208.10442v2, 18 pages.

Wang et al., "Long-tailed recognition by routing diverse distribution-aware experts," Paper, Presented at Proceedings of the International Conference on Learning Representations, Virtual Event, May 3-7, 2021, pp. 1-15.

Wang et al., "Training data is more valuable than you think: A simple and effective method by retrieving from training data," CoRR, Submitted on Mar. 16, 2022, arXiv:2203.08773v1, 11 pages.

Wu et al., "Memorizing transformers," Paper, Presented at Proceedings of the International Conference on Learning Representations, Virtual Event, Apr. 25-29, 2022, pp. 1-19.

Xiang et al., "Learning from multiple experts: Self-paced knowledge distillation for long-tailed classification," Paper, Presented at proceedings of the European Conference on Computer Vision, Glasgow, UK, Aug. 23-28, 2020; LNCS, 2020, 12350:1-17.

Yu et al., "CoCa: Contrastive Captioners are Image-Text Foundation Models," CORR, Submitted on Jun. 14, 2022, arXiv:2205.01917v2, pp. 1-19.

Yuan et al., "Florence: A New Foundation Model for Computer Vision," CoRR, Submitted on Nov. 22, 2021, arXiv:2111.11432v1, 17 pages.

Zhai et al., "LiT: Zero-Shot Transfer with Locked-image text Tuning, " Paper, Presented at Proceedings of the IEEE/CVF Conference: Computer Vision and Pattern Recognition, New Orleans, LA, Jun. 18-24, 2022, pp. 18123-18133.

Zhai et al., "Scaling vision transformers," Paper, Presented at Proceedings of the IEEE/CVF Conference: Computer Vision and Pattern Recognition, New Orleans, LA, Jun. 18-24, 2022, pp. 12104-12113.

Zhao et al., "Improving long-tailed classification from instance level," CoRR, Submitted on Apr. 13, 2021, arXiv:2104.06094v1, 10 pages.

Zhou et al., "BBN: Bilateral-branch network with cumulative learning for long-tailed visual recognition," Paper, Presented at Proceedings of the IEEE/CVF Conference: Computer Vision and Pattern Recognition, Seattle, WA, Jun. 13-19, 2020, pp. 9719-9728.

Zhou et al., "Places: A 10 Million Image Database for Scene Recognition," IEEE Transactions on Pattern Analysis and Machine Intelligence, Jun. 2018, 40(6):1452-1464.

* cited by examiner

200

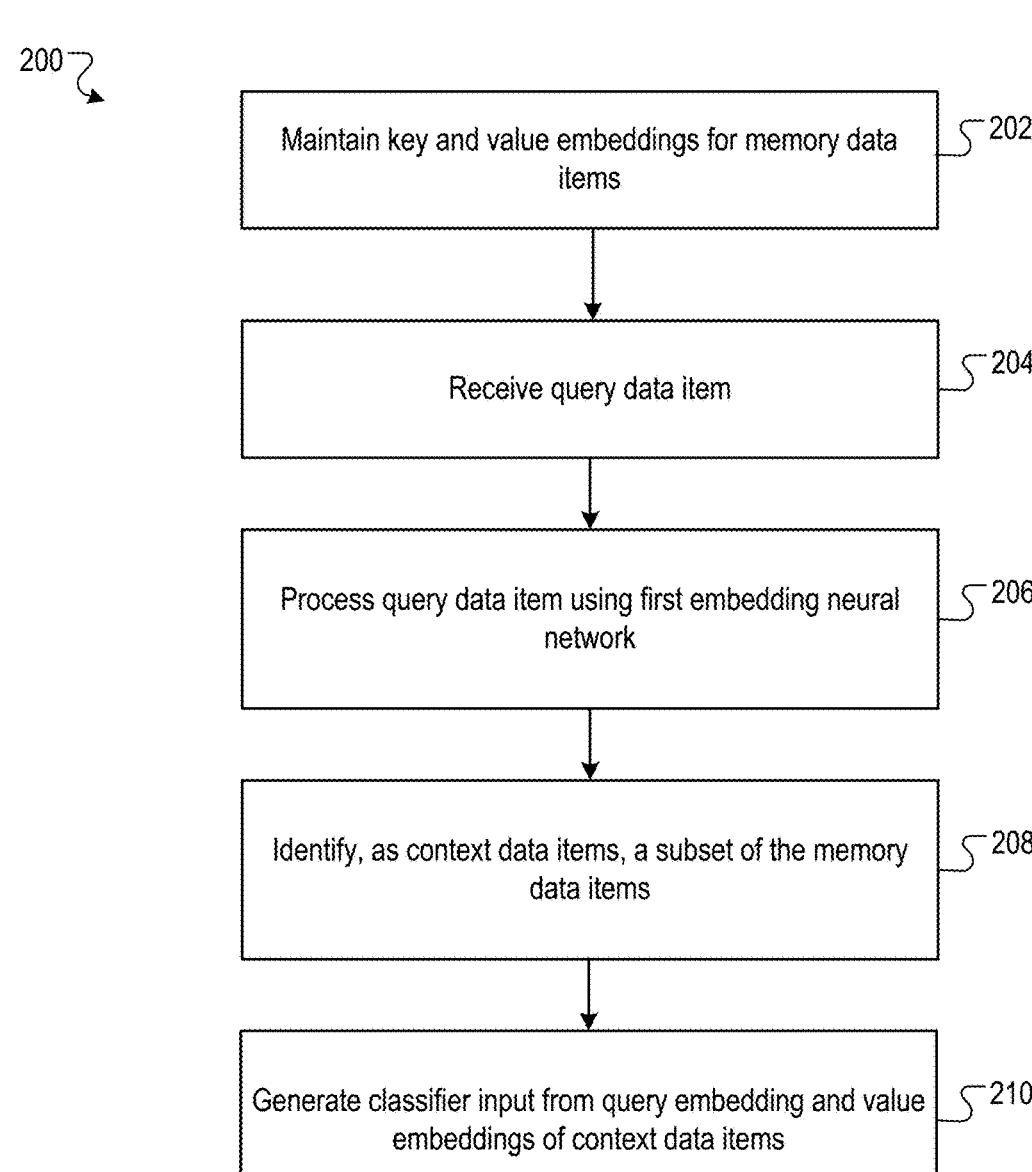

Maintain key and value embeddings for memory data items ⟩ 202

Receive query data item ⟩ 204

Process query data item using first embedding neural network ⟩ 206

Identify, as context data items, a subset of the memory data items ⟩ 208

Generate classifier input from query embedding and value embeddings of context data items ⟩ 210

Process classifier input using classifier neural network to generate classification output ⟩ 212

|  | iNat2021-Mini | WebVision |
|---|---|---|
| BASELINES | | |
| Linear Classifier | 58.8 | 78.1 |
| MLP Classifier | 59.6 | 81.0 |
| Mean k-NN | 58.9 | 78.2 |
| EXISTING METHODS | | |
| MILe [36] | — | 75.2 |
| Heteroscedastic [9] | — | 76.6 |
| NCR [23] | — | 76.8 |
| CurrNet [17] | — | 79.3 |
| Ours | 66.2 | 83.6 |

FIG. 5

INPUT DATA ITEM CLASSIFICATION USING MEMORY DATA ITEM EMBEDDINGS

CROSS-REFERENCE TO RELATED APPLICATION

This application claims priority to U.S. Provisional Application No. 63/494,215, filed on Apr. 4, 2024. The disclosure of the prior application is considered part of and is incorporated by reference in the disclosure of this application.

BACKGROUND

This specification relates to classifying inputs, e.g., images, using neural networks. Neural networks are machine learning models that employ one or more layers of nonlinear units to predict an output for a received input. Some neural networks include one or more hidden layers in addition to an output layer. The output of each hidden layer is used as input to another layer in the network, e.g., the next hidden layer or the output layer. Each layer of the network generates an output from a received input in accordance with current values of a respective set of weights.

SUMMARY

This specification describes a system implemented as computer programs on one or more computers that performs a classification task on a data item, e.g., on an input image.

In particular, the system performs the classification task using key embeddings and value embeddings for each of multiple memory data items.

Particular embodiments of the subject matter described in this specification can be implemented so as to realize one or more of the following advantages.

Increasing the number of parameters of large models, e.g., transformer models, has been a recent successful trend in achieving improved performance on a variety of computer vision and language tasks. For example, recent results show that transformer models are able to store a surprising amount of information when scaled to tens of billions of parameters and trained on vast text and image corpora. These so-called 'foundation models' achieve state-of-the-art results when fine-tuned and applied to secondary tasks such as language modeling, image captioning, visual question answering and open vocabulary recognition.

However, in these foundation models, the learned world knowledge is stored implicitly in the parameters of the underlying neural network. As a result, some of the problems of the current machine learning paradigm are amplified in these models: (a) scaling is challenging, both in learning and serving, given the large number of parameters of the foundational model and, therefore, the exceedingly large amount of memory required to store the model and (b) it is hard to update the model as the context changes or input data gets modified, i.e., further training the models is difficult given their exceedingly large amount of parameters.

To address the above issues, instead of attempting to compile all required knowledge statically into model weights, the described techniques use an approach where the knowledge gets transformed into a massive-scale index/memory. Thus, instead of requiring a large foundational model, the described techniques use a relatively low-compute small model ("classifier neural network") that learns to use the memory for the given inference task. In other words, instead of increasing the size of the model and training on more data as done in most previous techniques, this specification instead equips models with the ability to directly access a large database to perform predictions—a semi-parametric approach.

Thus, this specification describes a retrieval-augmented recognition model that explores efficient means of augmenting models, e.g., computer vision models that perform image classification tasks, with a massive-scale memory without significantly increasing computations.

In some implementations, the described techniques use a memory attention module to fuse the retrieved knowledge from the memory (key and value embeddings for context data items) with the input query for processing using the classifier neural network. The memory attention module learns the importance of each retrieved example from the memory. Compared to existing approaches, this removes the influence of the irrelevant retrieved examples, and retains those that are beneficial to the input query. Thus, the classifier neural network can more effectively classify the input data item.

As a result, the described techniques can achieve state-of-the-art results on various tasks, including difficult tasks like long-tail recognition and learning with noisy labels. In particular, the described techniques allow the memory dataset to massively scaled up, e.g., to 1 billion image-text pairs or greater, without a corresponding increase in inference-time latency or computational resource consumption.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for classifying an input data item.

FIG. 5 shows an example of the performance of the described techniques.

Like reference numbers and designations in the various drawings indicate like elements.

DETAILED DESCRIPTION

Figure 1:
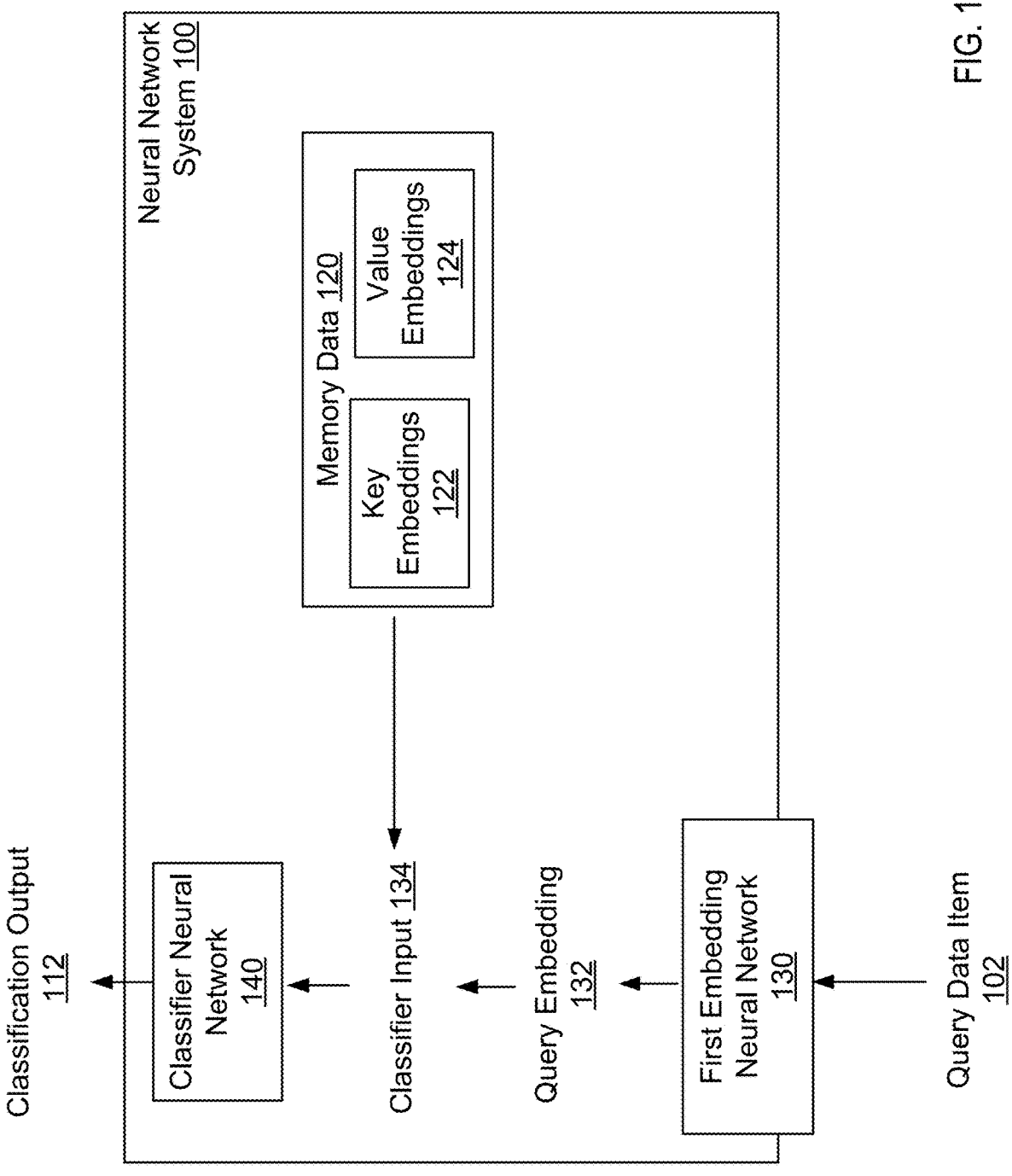
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 is a system that performs a classification task on a data item 102 to generate a classification output 112.

The system 100 can be configured to perform any of a variety of classification tasks.

As used in this specification, a classification task is any task that that requires the system 100 to generate, for an input data item 102, an output that includes a respective score for each of a set of multiple categories and, optionally, to then select one or more of the categories as a "classification" for the data item using the respective scores.

That is, the classification output 112 can identify one or more selected categories and, optionally, the scores for the selected categories.

The classification task may be an image recognition or object detection task, where the input data item comprises pixel data, for example pixel data of an image, or pixel data of one or more frames of video. The task may be to classify the pixel data as depicting an object from one or more object categories. That is, the classification output for a given input may be a prediction of one or more object categories that are depicted in the pixel data.

One example of a classification task is image classification, where the input data item is an image, i.e., the intensity values of the pixels of the image, the categories are object categories, and the task is to classify the image as depicting an object from one or more of the object categories. That is, the classification output for a given input image is a prediction of one or more object categories that are depicted in the input image.

Another example of a classification task is video classification, where the input data item is a video, i.e., the intensity values of the pixels of the video frames in the video, and the categories are, e.g., object categories, and the task is to classify the video as depicting an object from one or more of the object categories. Alternatively, the categories may be action categories, and the task may be to classify the video as depicting an action from one or more of the actions being performed.

Another example of a classification task is text classification, where the input data item is text and the task is to classify the text as belonging to one multiple categories. One example of such a task is sentiment analysis task, where the categories each correspond to different possible sentiments of the task. Another example of such a task is a reading comprehension task, where the input text includes a context passage and a question and the categories each correspond to different segments from the context passage that might be an answer to the question. Other examples of text processing tasks that can be framed as classification tasks include an entailment task, a paraphrase task, a textual similarity task, a sentiment task, a sentence completion task, a grammaticality task, and so on.

Other examples of classification tasks include speech processing tasks, where the input data item is audio data representing speech. Examples of speech processing tasks include language identification (where the categories are different possible languages for the speech), hotword identification (where the categories indicate whether one or more specific "hotwords" are spoken in the audio data), topic classification and so on. More generally, the classification task can be an audio classification task, where the input data item is audio data and the categories can represent, e.g., different speakers captured in the audio data, different sound emitting objects generating sound in the audio data, different musical instruments generating music in the audio data, different animals making noises in the audio data, and so on.

As another example, the task can be a health prediction task, where the input is a sequence derived from electronic health record data for a patient and the categories are respective predictions that are relevant to the future health of the patient, e.g., a predicted treatment that should be prescribed to the patient, the likelihood that an adverse health event will occur to the patient, predictions related to the presence or absence (or the severity) of a given medical condition, or a predicted diagnosis for the patient.

In particular, to perform the classification task, the system 100 maintains memory data 120.

The memory data 120 includes, for each of a plurality of memory data items, (i) a respective key embedding 122 and (ii) a respective value embedding 124.

The memory data items are generally data items of the same type as the data items to be classified by the system 100. That is, when the system 100 classifies images, the memory data items are also images. When the system 100 classifies audio data, the memory data items are also audio data.

An embedding is a numeric representation in a fixed dimensional space, i.e., an ordered collection of a fixed number of numeric values. For example, the embedding can be a vector or a matrix of floating point values or other type of numeric values.

In general, while the system 100 stores the key and value embeddings 122 and 124, the system 100 does not need to store or access the underlying memory data items. That is, the system 100 can store the key and value embeddings without accessing and, optionally, without storing the memory data items.

Because the key and value embeddings are generally significantly more compact than the underlying data items, not needing to store the memory data items themselves allows the system 100 to scale the memory 120 to represent a large number of memory data items, e.g., one billion or more memory data items.

That is, because the key and value embeddings are "compressed" representations of the underlying memory data items, the system 100 only stores the compressed representations and does not need to store the underlying data items, drastically reducing the amount of memory required to score the data items and allowing the system 100 to scale the memory 120 to represent a very large number of memory data items.

The system 100 can maintain the key and value embeddings using any of a variety of data storage schemes. For example, the system 100 can partition (or "shard") the key and value embeddings across multiple physical memory in one or more physical locations.

In some implementations, because the system 100 only needs to maintain the key and value embeddings rather than the underlying data items, the system 100 can maintain the memory on a mobile device or other edge device, e.g., tablet computer or a smart speaker, and can therefore use the memory 120 to improve the operation of a classification task performed locally on the edge device without needing to transmit data over a data communication network.

Generating the key and value embeddings will be described in more detail below.

When performing the classification task, the system 100 receives a query data item 102.

The system 100 processes the query data item 102 using a first embedding neural network 130 to generate a query embedding 132 of the query data item 102.

The first embedding neural network 130 can be any appropriate neural network that can map data items of the type that are being classified by the system 100 to an embedding. For example, when the data items are images, the first embedding neural network 130 can be a convolutional neural network or a vision Transformer neural network.

As another example, when the data items are text, the first embedding neural network 130 can be a Transformer neural network or a recurrent neural network (RNN).

As yet another example, when the data items are audio, the first embedding neural network 130 can be a convolutional neural network or a Transformer neural network.

The system 100 identifies, as context data items, a subset of the plurality of memory data items using the query embedding 132 and the respective key embeddings 122 for the plurality of memory data items.

For example, the system 100 can perform a kNN or an approximate kNN search through the respective key embeddings 122 (with the query embedding 132 as the query) of the memory data items to identify the context data items.

Once the system 100 has identified the context data items, the system 100 generates, from the query embedding 132 and the respective value embeddings 124 for the context data items, i.e., the data items that were identified using the query embedding 132 and the respective key embeddings 122 for the plurality of memory data items, a classifier input 134.

The system 100 then processes the classifier input 134 using a classifier neural network 140 to generate the classification output 112 for the query data item 102.

That is, the system 100 uses the memory data 120 to augment the input to the classifier neural network 140, i.e., to provide additional context to the classifier neural network 140 (in addition to the query embedding 132) that will assist the classifier neural network 140 in more effectively classifying the query data item 102.

The classifier neural network 140 can generally have any appropriate architecture for mapping from a classifier input, e.g., an embedding or a set of embeddings, to an output that specifies a respective score for each of the classes for the classification task. For example, the classifier neural network 140 can be a multi-layer perceptron (MLP) or other feedforward neural network.

In particular, because of the use of the memory data 120 to augment the input to the classifier neural network 140, the classifier neural network 140 can have a more computationally efficient architecture, i.e., one that has fewer parameters and therefore requires fewer FLOPs to execute, while still achieving better performance on the classification task than classifiers used in existing techniques.

As described above, the key embeddings 122 are generated using a different process than the value embeddings 124 and, therefore, for at least some of the memory data items, the key embedding 122 is different from the value embedding 124.

In particular, in some implementations, the key embedding 122 and value embedding 124 for a given memory data item are both generated from the memory data item, but are generated using different processes.

For example, the key embeddings 122 can be generated using the first embedding neural network while the value embeddings 124 are generated using another embedding neural network.

For example, the other embedding neural network can have (i) more parameters than the first embedding neural network, (ii) can generate embeddings that have a higher dimensionality than the embeddings generated by the first embedding neural network, or (iii) both. That is, because the system 100 searches through all of the key embeddings, but only accesses the value embeddings for a small number of context data items, the value embeddings can be more computationally expensive to retrieve.

In some other implementations, each memory data item is of a first type and is associated with a corresponding data item of a different, second type.

For example, the memory data items can be images or videos that are associated with corresponding text or audio that describes the image or video.

As another example, the memory data items can be audio and can be associated with corresponding text, images, or videos that describe the audio.

As another example, the memory data items can be text and can be associated with corresponding images, videos, or audio that describe the text.

In these implementations, the key embedding for a given memory data item can have been generated by processing the given memory data item using the first embedding neural network while the value embedding for the given memory data item can have been generated by processing the corresponding data item (of the other type) using a third embedding neural network.

Prior to performing the classification task on new query inputs, the system 100 or another training system trains the classifier neural network 140 on labeled training data for the classification task. The training data for the classification task includes a set of training data items and, for each data item, a target (or "ground truth") classification output. The training system can train the classifier neural network 140 on the training data using an appropriate classification loss function, e.g., the cross-entropy loss, the LACE loss, or another appropriate loss function.

Generally, the first embedding neural network 130 and the embedding neural network used to generate the value embeddings have been pre-trained prior to the training of the classifier neural network 140. For example, the system 100 can perform this pre-training, e.g., on an unsupervised or semi-supervised representation learning task, or can obtain a pre-trained model that has been pre-trained by another system.

In particular, prior to training the classifier neural network 140, the training system can generate the respective key and value embeddings of each of the memory data items and then hold the key and value embeddings fixed during the training.

This allows the training system to efficiently use large memory datasets, e.g., with up to 1 billion data items, as the memory key embeddings are computed once and then indexed only once offline for efficient k-NN search with the query vectors during the training process (and, as described above, while performing the classification task after inference).

Additionally, pre-computing the value embeddings allows the training system (and, therefore, the system 100 when performing the task) to use embeddings generated by very large models, as the memory values are only computed once offline, and the actual model used to compute the value embeddings is not needed during the training or inference.

During the training, the training system can hold the first embedding neural network 130 fixed or can fine-tune, i.e., further train, the first embedding neural network 130 jointly with the classifier neural network 140.

FIG. 2 is a flow diagram of an example process 200 for classifying a query data item. For convenience, the process 200 will be described as being performed by a system of one or more computers located in one or more locations. For example, a neural network system, e.g., the neural network system 100 of FIG. 1, appropriately programmed, can perform the process 200.

The system maintains, for each of a plurality of memory data items, (i) a respective key embedding and (ii) a respective value embedding (step 202).

For example, as described above, for each memory data item, the respective key embedding can have been generated by processing the memory data item using the first embedding neural network while the respective value embedding can have been generated by processing the memory data item or a corresponding data item of a different type using a different embedding neural network.

The system receives a query data item (step 204).

The system processes the query data item using the first embedding neural network to generate a query embedding of the query data item (step 206).

The system identifies, as context data items, a subset of the plurality of memory data items using the query embedding and the respective key embeddings for the plurality of memory data items (step 208). For example, the system may access a database comprising the plurality of memory data items. The system may retrieve the subset of the plurality of memory data items from the database, for instance by way of a structured query procedure.

As one example, the system can identify the subset by performing a search of the key embeddings of the memory data items to identify, as the context data items, the memory data items that have the k most similar key embeddings to the query embedding according to a similarity measure. Generally, k is a fixed integer that is less than a total number of memory data items. For example, even when the total number of memory data items is 1 million, 10 million, or even 1 billion, k can be equal to 10, 100, or 1000, i.e., a small fraction of the total number of memory data items.

As one example the search can be a k-nearest neighbors search.

As another example, e.g., when the number of memory data items is large, the search can be an approximate k-nearest neighbors search through the key embeddings.

The system generates, from the query embedding and the respective value embeddings for the context data items that were identified using the query embedding and the respective key embeddings for the plurality of memory data items, a classifier input (step 210).

Generally, the system can combine the query embedding and the respective value embeddings for the context data items to generate the classifier input.

The system can combine the query embedding and the value embeddings for the context data items in any of a variety of ways.

As one example, the system can first generate a combined value embedding from the respective value embeddings for the context data items and then combine the combined value embedding and the query embedding to generate the classifier input. For example, the system can sum or average the combined value embedding and the query embedding to generate the classifier input.

To generate the combined value embedding, the system can generate an initial combined value embedding from the respective value embeddings for the context data items. For example, this can be done by computing a mean of the respective value embeddings for the context data items.

The system can then optionally apply a dense neural network layer to the initial combined value embedding to generate the combined value embedding. For example, the query embedding can have one dimensionality and each value embedding can have a second, different dimensionality. The system can then use the dense neural network layer to map the initial combined value embedding from the second dimensionality to the first dimensionality.

When the system uses the dense layer in any of the above examples, the dense layer is trained jointly with the classifier neural network during training on the labeled training data for the classification task (described above).

As another example, the system can combine the query embedding and the respective value embeddings for the context data items to generate the classifier input using an attention mechanism. This attention mechanism will also be referred to in this specification as a memory attention module (MAM).

In particular, the system can process the query embedding and the respective value embeddings through a sequence of one or more attention layers.

Each attention layer is configured to receive an input query embedding and compute a respective attention weight for each context data item by, for each context data item, computing an attention weight between the input query embedding and the key embedding for the context data item.

To compute the attention weights, the layer can apply one dense layer to the input query embedding to generate a query and apply another dense layer to the key embeddings to generate keys.

The layer can then perform scaled dot product attention between the queries and the keys to generate a respective attention weight for each of the context data items.

The attention layer is then configured to compute an aggregated value embedding by computing a weighted sum of the value embeddings for the context data items in accordance with the respective attention weights and then use the aggregated value embedding to update the input query embedding.

For example, to use the aggregated value embedding to update the input query embedding, the layer can generate an initial updated query embedding from the aggregated value embedding and then combine the initial updated query embedding and the query embedding to generate the updated query embedding. For example, the layer can sum the initial updated query embedding and the query embedding to generate the updated query embedding.

To generate the initial updated query embedding, the layer can apply a dense neural network layer to the aggregated value embedding to generate the initial updated query embedding. For example, as described above, the query embedding can have a first dimensionality, each value embedding can have a second, different dimensionality and the dense neural network layer can map the aggregated value embedding from the second dimensionality to the first dimensionality.

$f_L z_i M_{NN} \psi_Q \psi_K$ As a particular example, the output of the L-th attention layer can be represented as:

$$f_L z_i M_{NN} V_{NN} \psi_Q \psi_K$$

$$f_i^L = z_i + \chi \left( \sigma \left( \frac{\psi_Q(f_i^{L-1}) \psi_K(M_{NN})}{\sqrt{d}} \right) V_{NN} \right),$$

$f_L z_i M_{NN} V_{NN} \psi_Q \psi_K$ where is the query embedding, are the key embeddings, are the value embeddings, $\sigma$ is a softmax function, d is a scaling factor, e.g., the dimensionality of the query embeddings or the value embeddings, and, and $\chi$ represent respective linear layers.

Generally, the input query embedding for the first attention layer in the sequence is the query embedding (of the query data item).

Thus, the attention layer(s) update the query embedding by incorporating context from the value embeddings of the memory context items. Because each layer generates a learned attention weight, the attention layer(s) can assign greater weights to more relevant memory context items, thereby increasing the influence of the value embeddings for those memory context items and reducing the influence of irrelevant context items on the final input to the classifier.

When the system uses the memory attention module, the attention layers of the memory attention module are trained jointly with the classifier neural network during training on the labeled training data for the classification task (described above).

The system processes the classifier input using a classifier neural network to generate a classification output for the query data item (step 212).

Optionally, after the system generates the classification output for the query data item, the system can generate a value embedding of the query data item using the embedding neural network used to generate the value embeddings and then adds the query embedding and the value embedding to the memory. That is, the system uses the query embedding of the query data item as the key embedding of a new memory data item and the value embedding of the query data item as the value embedding of the new memory data item. The system can then discard the query data item.

Figure 3:
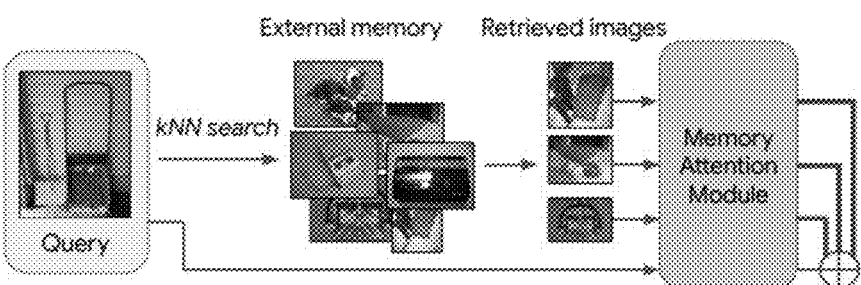
FIG. 3 shows an example of the operation of the system.

FIG. 3 shows an example 300 of the operation of the system when the system uses an attention module to combine the query embeddings and the value embeddings of the context data items.

As shown in the example of FIG. 3, the system receives query image.

The system then performs a kNN search over the memory data items to identify three context images as described above.

The system then processes the query embedding of the query image and respective value embeddings for each of the context images using a memory attention module to generate the final classifier input that will be processed by the classifier neural network.

As can be seen from the example of FIG. 3, the system learns the importance of each retrieved image by assigning high weights (green line in the figure) to the relevant images, and low weights (red line) to the irrelevant images.

This can therefore improve the performance of the classifier in classifying the query image.

Figure 4:
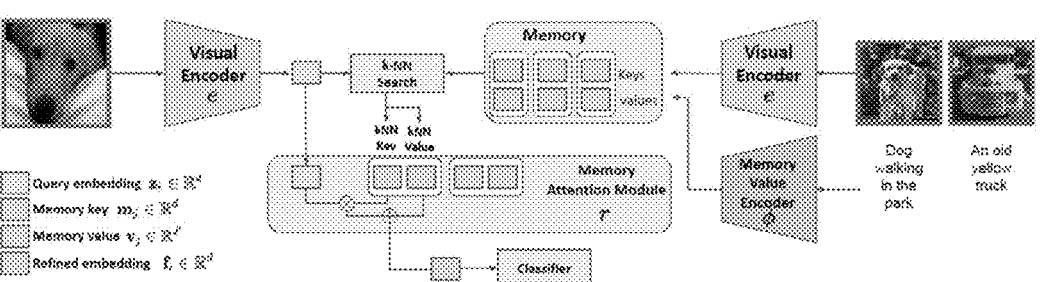
FIG. 4 shows another example of the operation of the system.

FIG. 4 shows another example of the operation of the system.

As shown in FIG. 4, the system receives a query image.

The system also maintains a set of memory images. In the example of FIG. 4, the memory images are each associated with a respective text description.

The system generates the memory data 120 by processing the memory images using the first embedding neural network to generate the key embeddings, but generates the value embeddings by processing the text description associated with each of the memory images using a memory value encoder, e.g., a text encoder neural network, e.g., a Transformer neural network or a recurrent neural network (RNN).

The system processes the query image using the first embedding neural network to generate a query embedding of the query image.

Because the data items in the example of FIG. 4 are images, the first embedding neural network is a visual encoder neural network, e.g., a convolutional neural network or a vision Transformer neural network.

The system then performs a k-NN or approximate k-NN search over the memory to identify, as context data items, a subset of the plurality of memory data items using the query embedding and the respective key embeddings for the plurality of memory data items. In particular, the output of the search are respective key and value embeddings of a set of context data items (denoted KNN keys and values in the Figure).

The system generates, from the query embedding and the respective value embeddings for the context data items, a classifier input (a "refined embedding").

As shown in the example 400, the system uses the memory attention module to generate the refined embedding.

The system then processes the classifier input using a classifier neural network generate a classification output for the query data item.

In particular, as can be seen from the example 400 of FIG. 4, although the query data item and the memory data items are images, the system uses embeddings of corresponding text of relevant memory images in order to provide additional information to the classifier neural network that can assist the classifier in accurately classifying the query image. Thus, the system can effectively incorporate multi-modal context in order to improve performance on an otherwise uni-modal classification task.

FIG. 5 shows an example 500 of the performance of the described techniques.

In particular, the example 500 shows the performance (in terms of accuracy) of the described techniques ("ours") relative to three baselines and four existing, high-performing techniques on the iNaturalist2021-Mini (fine-grained classification) and Webvision (learning with noisy labels) downstream data sets.

As can be seen from FIG. 5, the described techniques significantly outperform the baselines on the fine-grained classification task and also significantly outperform the baselines and the existing techniques on the learning with noisy labels task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

maintaining, for each of a plurality of memory data items, (i) a respective key embedding that has been generated by processing the memory data item using a first embedding neural network and (ii) a respective value embedding that has been generated by processing at least one of the memory data item or a corresponding data item associated with the memory data item using a second embedding neural network;

receiving a query data item; and classifying the query data item using a semi-parametric model that uses the respective key and value embeddings for the plurality of memory data items, comprising:

processing the query data item using the first embedding neural network to generate a query embedding of the query data item;

searching through the respective key embeddings of the memory data items by using the query embedding as a query to identify a subset of memory data item;

generating, from the query embedding and the respective value embeddings for the identified subset of memory data items that were identified from searching through the respective key embeddings of the memory data items by using the query embedding as the query, an input to a classifier neural network, wherein the input comprises a set of one or more embeddings generated by fusing the query embedding and the respective value embeddings for the identified subset of memory data items, wherein the fusing comprises (i) generating the input based on the query embedding and a combined value embedding generated from the respective value embeddings, or (ii) processing the query embedding and the respective value embeddings through a sequence of one or more attention layers; and processing the input using the classifier neural network to generate a classification output for the query data item that specifies one or more categories to which the query data item belongs.

2. The method of claim 1, wherein searching through the respective key embeddings of the memory data items by using the query embedding as a query to identify a subset of memory data items comprises:

performing a search of the key embeddings of the memory data items to identify, as the identified subset of memory data items, the memory data items that have the k most similar key embeddings to the query embedding according to a similarity measure, wherein k is a fixed integer that is less than a total number of memory data items.

3. The method of claim 2, wherein performing a search of the key embeddings comprises performing an approximate k-nearest neighbors search through the key embeddings.

4. The method of claim 1, wherein generating the input based on the query embedding and a combined value embedding generated from the respective value embeddings comprises:

summing the combined value embedding and the query embedding to generate the input to the classifier neural network.

5. The method of claim 1, wherein generating a combined value embedding from the respective value embeddings for the identified subset of memory data items comprises:

generating an initial combined value embedding from the respective value embeddings for the identified subset of memory data items.

6. The method of claim 5, wherein generating a combined value embedding from the respective value embeddings for the identified subset of memory data items comprises:

applying a dense neural network layer to the initial combined value embedding to generate the combined value embedding.

7. The method of claim 6, wherein the query embedding has a first dimensionality, each value embedding has a second, different dimensionality and wherein the dense neural network layer maps the initial combined value embedding from the second dimensionality to the first dimensionality.

8. The method of claim 5, wherein generating an initial combined value embedding from the respective value embeddings for the identified subset of memory data items comprises:

computing a mean of the respective value embeddings for the identified subset of memory data items.

9. The method of claim 1, wherein each attention layer in the sequence of one or more attention layers is configured to:

receive an input query embedding, compute a respective attention weight for each identified subset of memory data item by, for each identified subset of memory data item, computing an attention weight between the input query embedding and the key embedding for the identified subset of memory data item, compute an aggregated value embedding by computing a weighted sum of the value embeddings for the identified subset of memory data items in accordance with the respective attention weights, and use the aggregated value embedding to update the input query embedding, and the input query embedding for the first attention layer in the sequence is the query embedding.

10. The method of claim 9, wherein the updated query embedding generated by the last attention layer in the sequence is the input to the classifier neural network.

11. The method of claim 9, wherein the sequence comprises a plurality of attention layers, and wherein the input query embedding for each attention layer after the first attention layer in the sequence is the updated query embedding generated by a preceding attention layer in the sequence.

12. The method of claim 9, wherein using the aggregated value embedding to update the input query embedding comprises:

generating an initial updated query embedding from the aggregated value embedding; and combining the initial updated query embedding and the query embedding to generate the updated query embedding.

13. The method of claim 12, wherein combining the initial updated query embedding and the query embedding to generate the updated query embedding comprises:

summing the initial updated query embedding and the query embedding to generate the updated query embedding.

14. The method of claim 12, wherein generating an initial updated query embedding from the aggregated value embedding comprises:

applying a dense neural network layer to the aggregated value embedding to generate the initial updated query embedding.

15. The method of claim 14, wherein the query embedding has a first dimensionality, each value embedding has a second, different dimensionality and wherein the dense neural network layer maps the aggregated value embedding from the second dimensionality to the first dimensionality.

16. The method of claim 1, wherein the query data item is an image.

17. The method of claim 1 wherein the classifier neural network has been trained on labeled training data for a classification task.

18. The method of claim 17 wherein the classifier neural network has been trained jointly with one or more attention layers on the labeled training data for the classification task.

19. The method of claim 17, wherein the first embedding neural network has been pre-trained prior to the training of the classifier neural network on the labeled training data for the classification task.

20. The method of claim 19, wherein the pre-trained first embedding neural network is held frozen during the training of the classifier neural network on the labeled training data for the classification task.

21. The method of claim 19, wherein the pre-trained first embedding neural network is fine-tuned during the training of the classifier neural network on the labeled training data for the classification task.

22. The method of claim 17, wherein the memory and key embeddings were generated prior to the training of the classifier neural network on the labeled training data for the classification task and are held frozen during the training of the classifier neural network on the labeled training data for the classification task.

23. The method of claim 1, wherein the key embeddings have been generated by processing the memory data items using the first embedding neural network after the first embedding neural network has been pre-trained and prior to training the classifier neural network.

24. The method of claim 1, wherein the second embedding neural network is different from the first embedding neural network.

25. The method of claim 24, wherein the second embedding neural network has (i) more parameters than the first embedding neural network, (ii) generates embeddings that have a higher dimensionality than the embeddings generated by the first embedding neural network, or (iii) both.

26. The method of claim 1, wherein the memory data item is of a first type and the corresponding data item is of a different, second type, and, for each memory data item, the value embedding has been generated by processing the corresponding data item using the second embedding neural network.

27. The method of claim 26, wherein the corresponding data item for each memory data item is text describing the memory data item.

28. A system comprising:

one or more computers; and one or more storage devices storing instructions that, when executed by the one or more computers, cause the one or more computers to perform operations comprising:

maintaining, for each of a plurality of memory data items, (i) a respective key embedding that has been generated by processing the memory data item using a first embedding neural network and (ii) a respective value embedding that has been generated by processing at least one of the memory data item or a corresponding data item associated with the memory data item using a second embedding neural network;

receiving a query data item; and classifying the query data item using a semi-parametric model that uses the respective key and value embeddings for the plurality of memory data items, comprising:

processing the query data item using the first embedding neural network to generate a query embedding of the query data item;

searching through the respective key embeddings of the memory data items by using the query embedding as a query to identify a subset of memory data item;

generating, from the query embedding and the respective value embeddings for the identified subset of memory data items that were identified from searching through the respective key embeddings of the memory data items by using the query embedding as the query, an input to a classifier neural network, wherein the input comprises a set of one or more embeddings generated by fusing the query embedding and the respective value embeddings for the identified subset of memory data items, wherein the fusing comprises (i) generating the input based on the query embedding and a combined value embedding generated from the respective value embeddings, or (ii) processing the query embedding and the respective value embeddings through a sequence of one or more attention layers; and processing the input using the classifier neural network to generate a classification output for the query data item that specifies one or more categories to which the query data item belongs.

29. One or more computer-readable storage media storing instructions that when executed by one or more computers cause the one or more computers to perform operations comprising:

maintaining, for each of a plurality of memory data items, (i) a respective key embedding that has been generated by processing the memory data item using a first embedding neural network and (ii) a respective value embedding that has been generated by processing at least one of the memory data item or a corresponding data item associated with the memory data item using a second embedding neural network;

receiving a query data item; and classifying the query data item using a semi-parametric model that uses the respective key and value embeddings for the plurality of memory data items, comprising:

processing the query data item using the first embedding neural network to generate a query embedding of the query data item;

searching through the respective key embeddings of the memory data items by using the query embedding as a query to identify a subset of memory data item;

generating, from the query embedding and the respective value embeddings for the identified subset of memory data items that were identified from searching through the respective key embeddings of the memory data items by using the query embedding as the query, an input to a classifier neural network, wherein the input comprises a set of one or more embeddings generated by fusing the query embedding and the respective value embeddings for the identified subset of memory data items, wherein the fusing comprises (i) generating the input based on the query embedding and a combined value embedding generated from the respective value embeddings, or (ii) processing the query embedding and the respective value embeddings through a sequence of one or more attention layers; and processing the input using the classifier neural network to generate a classification output for the query data item that specifies one or more categories to which the query data item belongs.

30. The method of claim 1, wherein the respective key embeddings and the respective value embeddings of the plurality of memory data items are stored in a database, wherein the database is maintained separately from the classifier neural network, and wherein searching through the respective key embeddings of the memory data comprises searching the database.

* * * * *